(12) United States Patent
Friedman et al.

(10) Patent No.: US 9,734,371 B2
(45) Date of Patent: Aug. 15, 2017

(54) HYBRID TAG FOR RADIO FREQUENCY IDENTIFICATION SYSTEM

(71) Applicant: International Business Machines Corporation, Armonk, NY (US)

(72) Inventors: Daniel J. Friedman, Sleepy Hollow, NY (US); Duixian Liu, Scarsdale, NY (US); Mihai A. Sanduleanu, Abu Dhabi (AE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/750,249

(22) Filed: Jun. 25, 2015

(65) Prior Publication Data

US 2016/0292470 A1    Oct. 6, 2016

Related U.S. Application Data

(63) Continuation of application No. 14/673,916, filed on Mar. 31, 2015.

(51) Int. Cl.
 *H04B 10/00* (2013.01)
 *H04Q 5/22* (2006.01)
 (Continued)

(52) U.S. Cl.
 CPC .................. *G06K 7/1097* (2013.01)

(58) Field of Classification Search
 USPC ....................................................... 398/115
 See application file for complete search history.

(56) References Cited

U.S. PATENT DOCUMENTS 4,941,205 A * 7/1990 Horst ................. H04B 10/2587
                                                398/168
5,606,323 A * 2/1997 Heinrich ............ G06K 19/0701
                                                340/10.34
(Continued)

FOREIGN PATENT DOCUMENTS

CN      201725352 U    1/2011
CN      202600746 U    12/2012
(Continued)

OTHER PUBLICATIONS

S. Roy et al., "RFID: From Supply Chains to Sensor Nets," Proceedings of the IEEE, Jul. 2010, pp. 1583-1592, vol. 98, No. 9.
(Continued)

*Primary Examiner* — Ken N Vanderpuye
*Assistant Examiner* — Amritbir Sandhu
(74) *Attorney, Agent, or Firm* — Vazken Alexanian; Ryan, Mason & Lewis, LLP

(57) ABSTRACT

RFID (radio frequency identification) systems are provided in which tag and interrogator devices implement a hybrid framework for signaling including an optical transmitter/receiver system and an RF transmitter/receiver system. For instance, an RFID tag device includes: optical receiver circuitry configured to receive an optical signal having an embedded clock signal from an interrogator device, and convert the optical signal into an electrical signal comprising the embedded clock signal; clock extraction circuitry configured to extract the embedded clock signal from the electrical signal, and output the extracted clock signal as a clock signal for controlling clocking functions of the tag device; voltage regulator circuitry configured to generate a regulated supply voltage from the electrical signal, wherein the regulated supply voltage is utilized as a bias voltage for components of the tag device; and data transmitter circuitry
(Continued)

configured to wirelessly transmit tag data to the interrogator device.

5 Claims, 4 Drawing Sheets

(51) Int. Cl.
  *G08B 13/14* (2006.01)
  *G06K 7/10* (2006.01)

(56) References Cited

U.S. PATENT DOCUMENTS

| | | | | |
|---|---|---|---|---|
| 5,912,632 | A * | 6/1999 | Dieska | G06K 7/0008 331/10 |
| 6,243,013 | B1 * | 6/2001 | Duan | G06K 19/0701 340/572.4 |
| 6,593,845 | B1 * | 7/2003 | Friedman | G06K 19/0701 340/10.1 |
| 7,260,371 | B1 * | 8/2007 | Yones | H04W 52/42 340/10.1 |
| 7,587,190 | B2 * | 9/2009 | Balachandran | G06F 1/3203 340/572.1 |
| 7,642,918 | B2 * | 1/2010 | Kippelen | G06K 19/0723 340/10.1 |
| 7,652,313 | B2 | 1/2010 | Ellis-Monaghan et al. | |
| 7,652,557 | B2 * | 1/2010 | Kantrowitz | G06K 7/1097 340/10.1 |
| 7,791,481 | B2 | 9/2010 | Landt et al. | |
| 8,205,800 | B2 | 6/2012 | Addy | |
| 8,369,786 | B2 * | 2/2013 | Witschnig | H04B 5/0031 455/42 |
| 2001/0004236 | A1 * | 6/2001 | Letkomiller | B60C 23/0408 340/572.1 |
| 2003/0198474 | A1 | 10/2003 | Mooney et al. | |
| 2005/0001724 | A1 * | 1/2005 | Heinrich | G06K 7/0008 340/572.7 |
| 2005/0152261 | A1 * | 7/2005 | Kahlman | G06F 21/10 369/275.1 |
| 2005/0240370 | A1 | 10/2005 | Diorio et al. | |
| 2006/0127097 | A1 * | 6/2006 | Obrea | G06K 7/10336 398/115 |
| 2006/0248576 | A1 * | 11/2006 | Levinson | G06K 7/0008 726/1 |
| 2006/0284770 | A1 * | 12/2006 | Jo | H01Q 9/0421 343/700 MS |
| 2007/0015549 | A1 | 1/2007 | Hernandez et al. | |
| 2007/0050683 | A1 * | 3/2007 | Attinella | G06F 11/302 714/47.1 |
| 2007/0103311 | A1 | 5/2007 | Kippelen et al. | |
| 2007/0273485 | A1 * | 11/2007 | Balachandran | G06F 1/3203 340/10.34 |
| 2008/0088417 | A1 | 4/2008 | Smith et al. | |
| 2008/0244273 | A1 * | 10/2008 | Chen | H04L 9/00 713/189 |
| 2010/0061734 | A1 * | 3/2010 | Knapp | H04B 10/807 398/128 |
| 2010/0128749 | A1 | 5/2010 | Amann et al. | |
| 2010/0182160 | A1 | 7/2010 | Lu | |
| 2010/0328043 | A1 | 12/2010 | Jantunen et al. | |
| 2011/0053503 | A1 * | 3/2011 | Witschnig | H04B 5/0031 455/41.1 |
| 2011/0108616 | A1 | 5/2011 | Wang | |
| 2011/0205134 | A1 * | 8/2011 | Blumberg, Jr. | A47J 31/40 343/753 |
| 2011/0215156 | A1 | 9/2011 | Johnson, II et al. | |
| 2011/0318013 | A1 * | 12/2011 | Primm | G06K 7/1097 398/115 |
| 2012/0032785 | A1 | 2/2012 | Kamata | |
| 2012/0161338 | A1 | 6/2012 | Lowenthal et al. | |
| 2012/0234922 | A1 | 9/2012 | Sample et al. | |
| 2013/0030763 | A1 * | 1/2013 | Mazzillo | G01J 1/44 702/179 |
| 2013/0206837 | A1 | 8/2013 | Szu | |
| 2014/0016945 | A1 * | 1/2014 | Pan | H04B 10/1143 398/171 |
| 2015/0102908 | A1 * | 4/2015 | Griesmann | G06K 7/10198 340/10.1 |
| 2015/0227766 | A1 * | 8/2015 | Koezuka | G06K 7/10009 340/10.1 |

FOREIGN PATENT DOCUMENTS

| | | |
|---|---|---|
| CN | 202711296 U | 1/2013 |
| CN | 203562013 U | 4/2014 |
| CN | 103955736 A | 7/2014 |
| JP | 2013061888 A | 4/2013 |
| KR | 20090098472 A | 9/2009 |
| WO | 2008091826 A1 | 7/2008 |
| WO | 2009064402 A1 | 5/2009 |

OTHER PUBLICATIONS

M. Buckner et al., "GPS and Sensor-Enabled RFID Tags," Unclassified Document, Oak Ridge National Laboratory, http://www.ornl.gov/webworks/cppr/y2001/pres/118169.pdf, 2001, 5 pages.

A.P. Sample et al., "Design of a Passively-Powered, Programmable Sensing Platform for UHF RFID Systems," IEEE International Conference on RFID, Mar. 2007, pp. 149-156.

List of IBM Patents or Patent Applications Treated as Related.

Final Office Action dated Jan. 5, 2017 issued in U.S. Appl. No. 14/673,916, filed in the name of D.J. Friedman on Mar. 31, 2015 and entitled "Hybrid Tag for Radio Frequency Identification System."

* cited by examiner

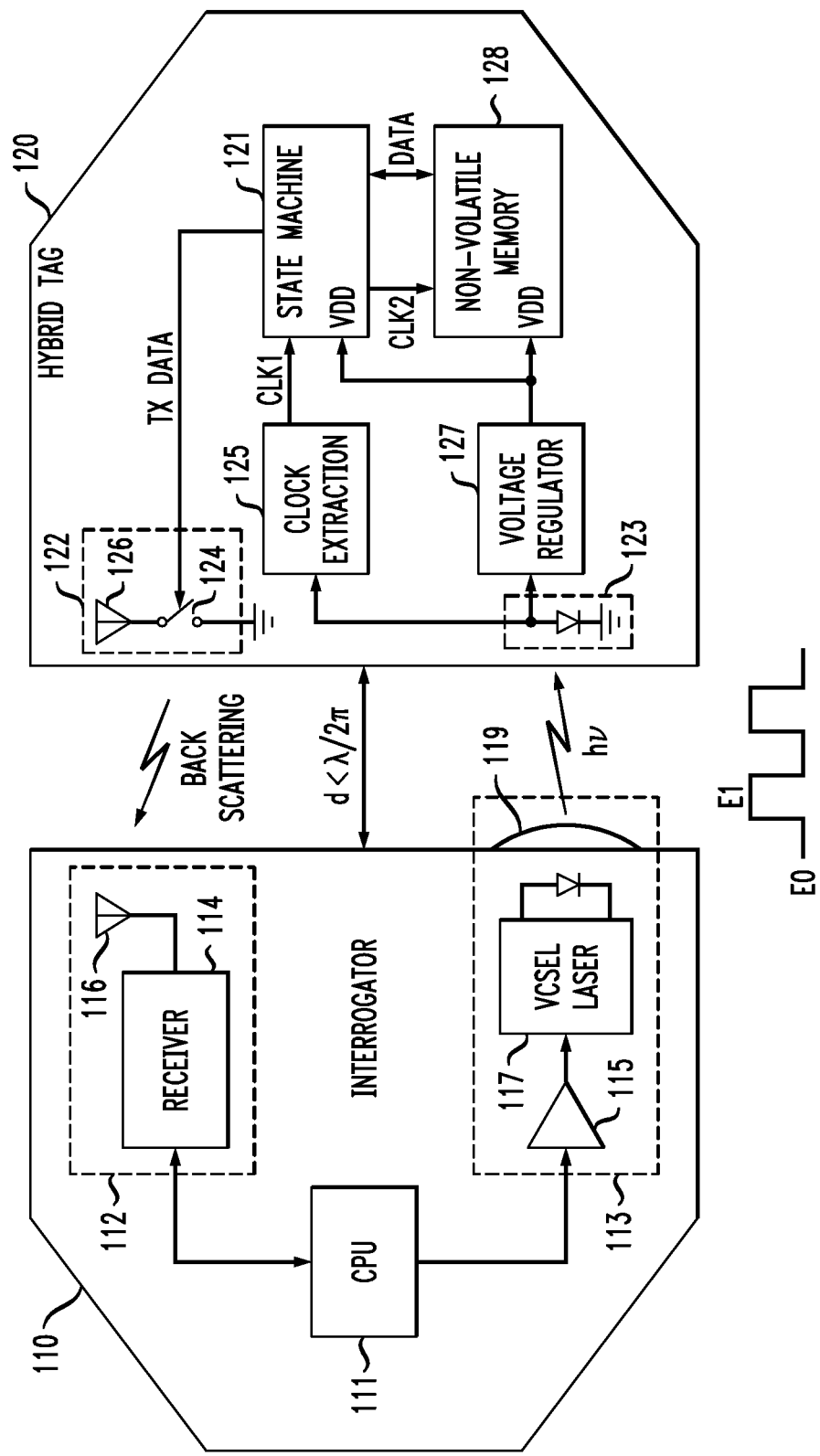

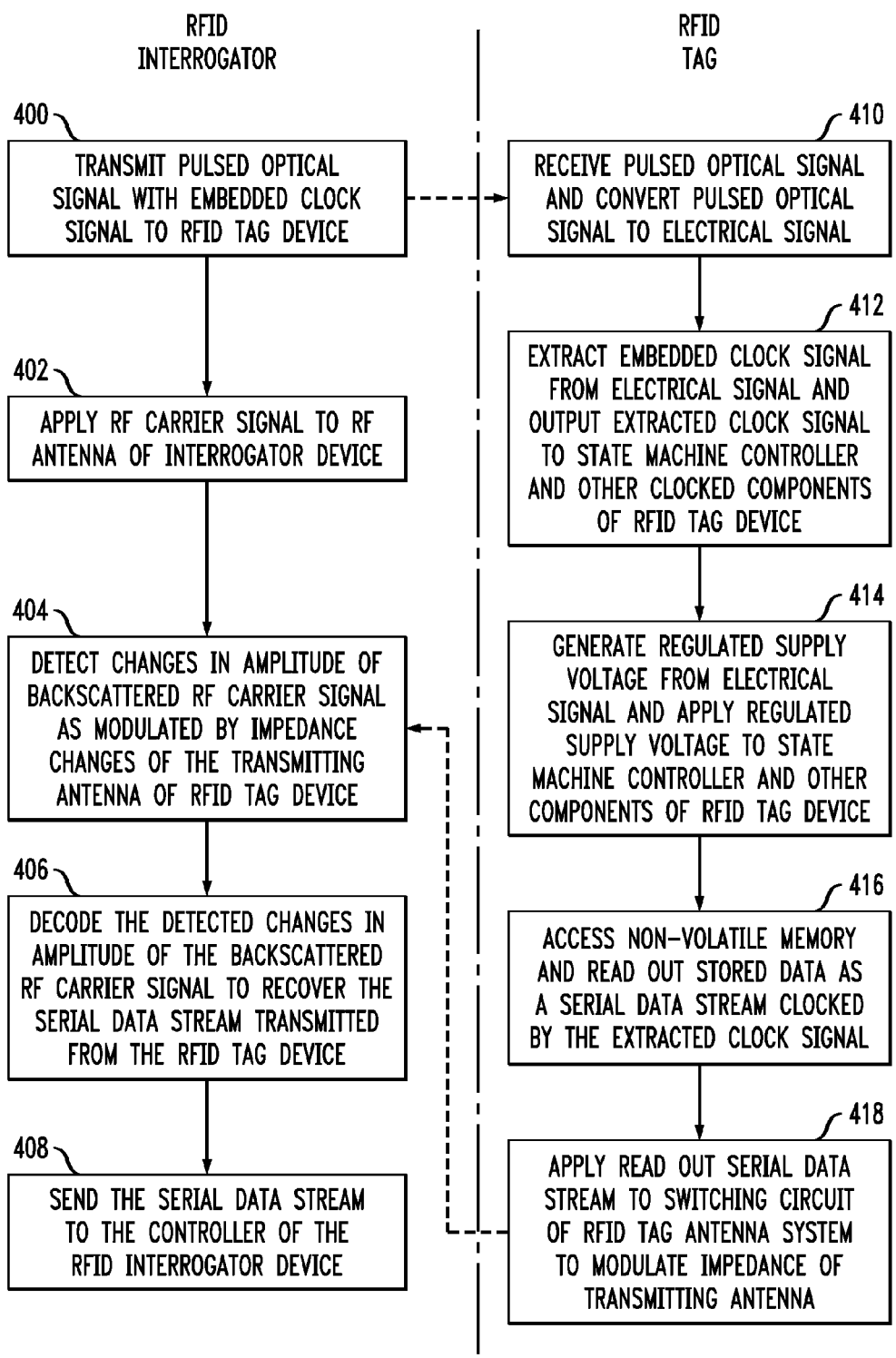

HYBRID TAG FOR RADIO FREQUENCY IDENTIFICATION SYSTEM

CROSS-REFERENCE TO RELATED APPLICATION

This application is a Continuation of U.S. patent application Ser. No. 14/673,916, filed on Mar. 31, 2015, the disclosure of which is incorporated herein by reference.

TECHNICAL FIELD

This disclosure generally relates to wireless communication systems and, in particular, to radio frequency identification systems

BACKGROUND

In general, a radio frequency identification (RFID) system utilizes RFID tag devices that are either attached to, or integrally formed in, objects that are to be identified or otherwise tracked for various types of applications. In addition, an RFID reader device (alternatively referred to as an "interrogator device") is utilized to communicate with an RFID tag device using a signaling scheme. With conventional signaling schemes, communication between an RFID reader and an RFID tag is commonly implemented using radio signals, wherein both the RFID reader and the RFID tag include separate receive and transmit antennas and associated transmitter and receiver circuitry. In such signaling schemes, transmission and receiving of signals can occur concurrently, wherein different RF frequencies are used for the transmit and receive modes of operation. In addition, such conventional signaling schemes must implement complex, area-consuming circuitry such as PLLs (phase-locked loops) and VCOs (voltage-controlled oscillators) to generate clock signals for controlling clocking functions on circuitry of the RFID tag device. Moreover, some RF tag devices have a battery, which can be an active battery, or a battery that is activated when in the presence of an RFID reader.

As industry standards continue to demand smaller footprint RFID tags for specialized applications (e.g., RFID tags with an integration area less than 100 μm×100 μm), it becomes problematic and non-trivial to construct RFID tags with conventional frameworks. For example, the use of two integrated antenna systems on a RFID tag device for receive and transmit modes requires a significant amount of real estate. While RFID tag devices can be implemented to operate at higher frequencies (e.g. 2.5 GHz) with smaller on-chip antennas, such antennas can still be relatively large and area consuming, and thus, not practical for very small footprint RFID tag devices. Moreover, when integration area is limited, mutual coupling and interference can occur between the transmit and receive antennas on the RFID tag device. Furthermore, as RFID tag decrease in size, it becomes impractical to use batteries or complex, area consuming power generating circuitry.

SUMMARY

Embodiments of the invention include components of RFID systems implementing a hybrid framework including an optical transmitter/receiver system and an RF transmitter/receiver system.

One embodiment of the invention includes a tag device. The tag device includes a substrate having a plurality of components integrally formed thereon. The components include state machine control circuitry, non-volatile memory, optical receiver circuitry, clock extraction circuitry, voltage regulator circuitry, and data transmitter circuitry. The state machine control circuitry is configured to control functions of the tag device. The non-volatile memory is configured to store tag data. The optical receiver circuitry is configured to receive an optical signal having an embedded clock signal from an interrogator device, and convert the optical signal into an electrical signal comprising the embedded clock signal. The clock extraction circuitry is configured to extract the embedded clock signal from the electrical signal, and output the extracted clock signal as a clock signal for controlling clocking functions of the tag device. The voltage regulator circuitry configured to generate a regulated supply voltage from the electrical signal, wherein the regulated supply voltage is utilized as a bias voltage for components of the tag device. The data transmitter circuitry is configured to wirelessly transmit tag data to the interrogator device.

Another embodiment of the invention includes an interrogator device. The interrogator device includes control circuitry, optical transmitter circuitry, an antenna, and receiver circuitry. The control circuitry is configured to control functions of the interrogator device. The optical transmitter circuitry is configured to generate and transmit an optical signal having an embedded clock signal to a tag device, wherein the embedded clock signal is recoverable by the tag device to control clocking functions of the tag device. The receiver circuitry is configured to (i) apply an unmodulated radio frequency carrier signal to the antenna, (ii) detect changes in amplitude of an amplitude modulated backscattered radio frequency carrier signal which is reflected from the tag device and captured on the antenna, and (iii) recover a serial data bit stream comprising tag data transmitted from the tag device, based on the detected changes in said amplitude of the amplitude modulated backscattered radio frequency carrier signal.

Another embodiment of the invention includes a method for reading data from a tag device. The method includes receiving an optical signal from an interrogator device, wherein the received optical signal comprises an embedded clock signal; converting the optical signal into an electrical signal which comprises the embedded clock signal; extracting the embedded clock signal from the electrical signal; utilizing the extracted clock signal as a clock signal for controlling clocking functions of the tag device; and generating a regulated supply voltage from the electrical signal, wherein the regulated supply voltage is utilized as a bias voltage for components of the tag device.

These and other embodiments of invention will be described in the following detailed description of embodiments, which is to be read in conjunction with the accompanying drawings.

BRIEF DESCRIPTION OF THE DRAWINGS

FIG. 1 schematically illustrates a radio frequency identification system according to an embodiment of the invention.

FIG. 4 is a flow diagram of a method for reading data from a tag device in a radio frequency identification system, according to an embodiment of the invention.

DETAILED DESCRIPTION

Figure 2A:
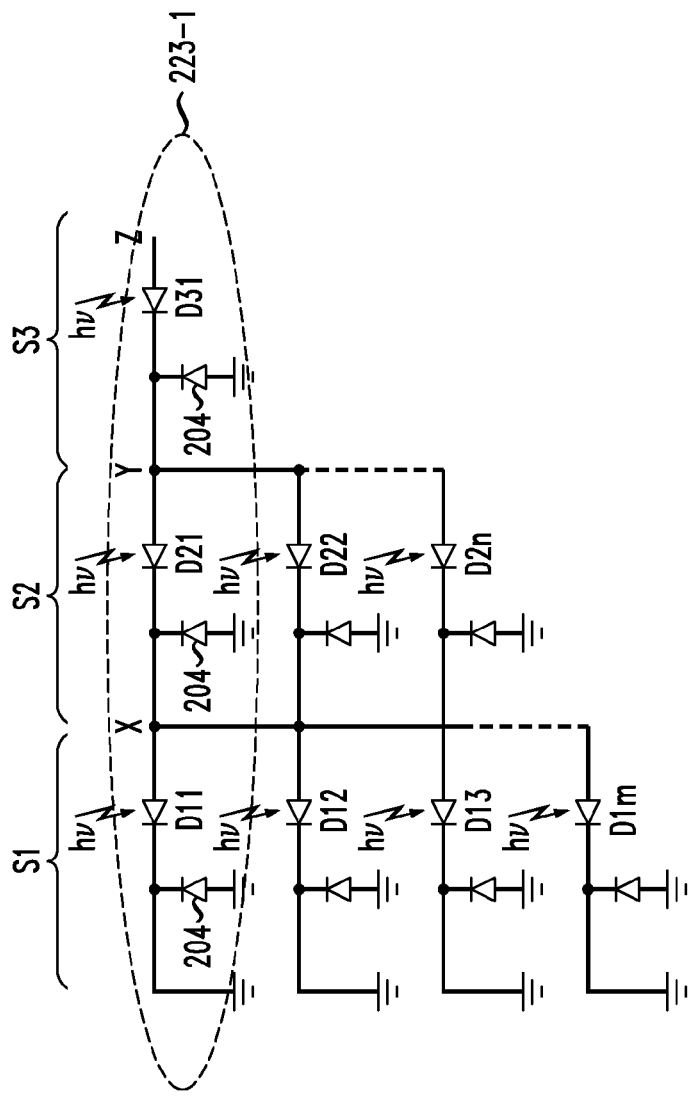
FIGS. 2A and 2B schematically illustrate an optical receiver that can be implemented in a tag device, according to an embodiment of the invention.

Embodiments of the invention will now be discussed in further detail with regard to RFID systems and techniques for implementing very small footprint RFID tag devices with high integration density of signaling circuitry, which may be integrated on-chip using CMOS silicon fabrication technologies, for example. Embodiments of RFID tag devices as described herein comprise a hybrid framework which includes an optical receiving system and a wireless transmitting system based on magnetic coupling. In addition, embodiments of RFID tag devices as described herein can operate in an autonomous manner without any on-chip batteries, and do not require complex circuitry such as voltage controlled oscillators (VCOs) and phase-locked loops (PLLs) to generate clock signals on the RFID tag device.

Instead, RFID tag devices according to embodiments of the invention are configured to extract clock signals from optical signals received from an RFID interrogator device, and use the extracted clock signal for clocking various on-chip components and functions of the RFID tag device such as a finite state machine controller and memory access operations. In addition, RFID tag devices according to embodiments of the invention are configured to generate an on-chip regulated supply voltage using the optical signals received from an RFID interrogator device to provide a bias voltage (e.g., VDD) for on-chip analog and digital circuitry of the RFID tag device.

It is to be understood that the various components and structures shown in the accompanying drawings are not drawn to scale, and that one or more components or structures of a type commonly used for RFID reader or tag devices may not be explicitly shown in a given drawing. Moreover, the same or similar reference numbers used throughout the drawings are used to denote the same or similar component, elements, or structures, and thus, a detailed explanation of the same or similar features, elements, or structures will not be repeated for each of the drawings.

FIG. 1 schematically illustrates a radio frequency identification system 100 according to an embodiment of the invention. The radio frequency identification system 100 comprises an RFID interrogator device 110 (or reader device) and an RFID tag device 120. The interrogator device 110 comprises a controller 111 (e.g., a central processing unit), an RF receiver system 112, and an optical transmission system 113. The RF receiver system 112 comprises receiver circuitry 114 and an RF antenna 116. The optical transmission system 113 comprises optical driver circuitry 115, a laser-emitting device 117, and an integrated lens 119. The controller 111 controls operation of the RF receiver system 112 and the optical transmission system 113, and other components of the interrogator device 100 which may be implemented.

The tag device 120 comprises a state machine controller 121, a data transmitting system 122, and an optical receiver 123. The data transmitting system 122 comprises switching circuitry 124 and a planar antenna 126. The tag device 120 further comprises clock extraction circuitry 125, voltage regulator circuitry 127, and a non-volatile memory 128. As explained in further detail below, the radio frequency identification system 100 implements a hybrid optical/RF framework for signaling and communication between the RFID interrogator device 110 and RFID tag device 120. In one embodiment of the invention, the tag device 120 is constructed using bulk CMOS semiconductor fabrication techniques, and can be fabricated on a substrate that is flexible or not flexible, using known materials and fabrication techniques.

The optical transmission system 113 is configured to generate and transmit an optical signal having an embedded clock signal to the tag device 120, wherein the embedded clock signal is recoverable by the tag device 120 to control clocking functions of the tag device 120. In one embodiment of the invention, the optical transmission system 113 comprises a laser optical system, wherein the laser-emitting device 117 comprises one or more laser diodes. More specifically, in one embodiment of the invention, the laser optical system comprises a vertical-cavity surface-emitting laser (VCSEL) system, wherein the laser-emitting device 117 comprises a high-power VCSEL semiconductor laser diode that emits an optical laser beam perpendicular from a top surface thereof.

The optical driver circuitry 115 is configured to control modulation of the laser emitting device 117 and cause the laser emitting device 117 to generate and output a pulsed optical laser signal having the embedded clock signal. In one embodiment, the optical driver circuitry 115 comprises circuitry that is configured to drive a VCSEL semiconductor laser diode. The driver circuitry 115 is configured to modulate the emitted power of the laser-emitting device 117, and emit an alternating sequence of logic ones and zeros, corresponding to pulses of high or low power, respectively.

In particular, in one embodiment of the invention, as depicted in FIG. 1, the optical transmission system 113 outputs an optical signal ($h_v$) with two different intensities E0 and E1, wherein the intensity E0 represents a logic zero, and the intensity E1 represents a logic 1. In addition, the optical signal ($h_v$) is generated with a 50% duty cycle. In one embodiment of the invention, the optical signal $h_v$ is generated having a wavelength of 808 nm. As explained in further detail below, the embedded clock signal is extracted by the tag device 120 to clock various components of the tag device 120. In other embodiments of the invention, an optical signal can be modulated with data packets for other purposes. For example, data sent from the interrogator device could have a specific preamble that is read by the tag device 120 to control certain functions of the tag device 120.

In one embodiment, the integrated lens 119 comprises a micro lens that is formed as part of the laser-emitting device 117. The integrated lens is configured to collimate or otherwise focus the optical signals emitted from the laser-emitting device 117 toward the tag device 120.

Figure 2B:
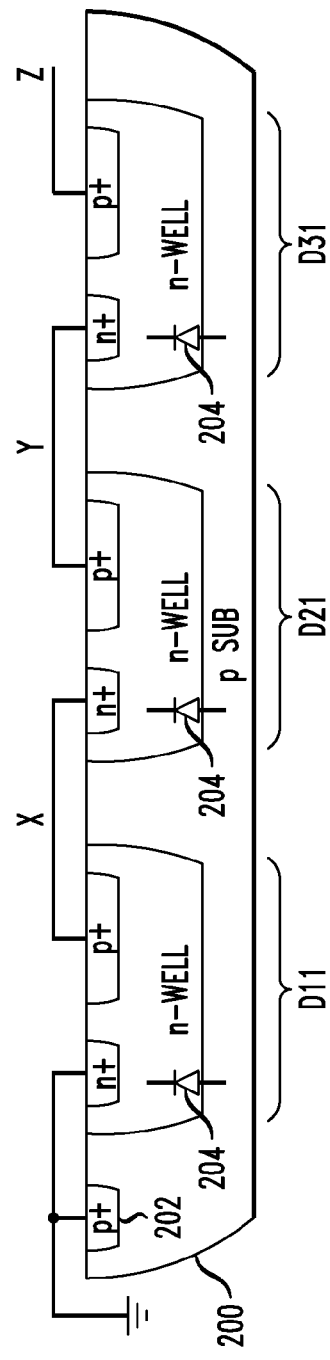

The optical receiver 123 on the tag device 120 receives optical signals transmitted from the optical transmission system 113 of the interrogator device 110. In one embodiment of the invention, the optical receiver 123 comprises plurality of photodiodes that are configured to operate in a photovoltaic mode without an external bias. FIGS. 2A and 2B schematically illustrate an embodiment of the optical receiver 123 which can be implemented in a tag device, according to an embodiment of the invention.

In particular, FIG. 2A is a schematic diagram of an optical receiver comprising a photodiode stack 223 according to an embodiment of the invention. The photodiode stack 223 comprises a plurality of photodiode stages S1, S2 and S3 that are serially connected between an output node Z and ground. The photodiode stage S3 comprises photodiode D31 connected between the output node Z of the photodiode stack 223 and an output node Y of the photodiode stage S2. The photodiode stage S2 comprises a plurality of photodiodes D21, D22, ..., D2n, which are connected in parallel between the node Y and an output node X of the photodiode stage S1. The photodiode stage S1 comprises a plurality of photodiodes D11, D12, ..., D1m, which are connected in parallel between the node X and a ground terminal.

FIG. 2B schematically illustrates a semiconductor substrate comprising the photodiode stack 223 of FIG. 2A. In particular, FIG. 2B is a schematic cross-sectional view of a semiconductor substrate 200 comprising a portion 223-1 of the photodiode stack 223 of FIG. 2A. More specifically, FIG. 2B illustrates photodiodes D11, D21, and D31 of FIG. 2A, which are serially connected between the output node Z of the photodiode stack 223 and ground. In one embodiment of the invention, as shown in FIG. 2B, the substrate 200 comprises a p-doped substrate which is connected to ground terminal via a p+ doped region 202. The grounding of the p-doped substrate 200 effectively provides a reversed biased diode junction 204 between the p-doped substrate 200 and each n-Well of the respective photodiodes D11, D21, and D31, as shown in FIGS. 2A and 2B, which provides isolation prevents leakage of current.

The on-chip integrated photodiode stack 223, which comprises a plurality of series and parallel-connected photodiodes, is configured to generate a large on-chip voltage. In silicon, a single photodiode operating in a photovoltaic mode can generate a voltage in a range of about 0.3V to about 0.4V. In the stacked photodiode configuration of FIGS. 2A and 2B, an output voltage of about 1.2V to 1.3V can be generated at the output node Z with current flowing through a load resistance connected to node Z. Indeed, with the stacked photodiode configuration, extra current flows in the parallel diodes connected to ground, that is, connected to nodes X and Y. The additional photodiode stages S2 and S3 enable larger currents to flow out of node Z.

Referring back to FIG. 1, the output of the optical receiver 123 is connected to inputs of the clock extraction circuitry 125 and the voltage regulator circuitry 127. The optical receiver 123 is configured to transform the optical signal hv (which is transmitted from the interrogator device 110) into an electrical AC signal having the same duty cycle as the optical signal, i.e., the electrical signal comprises a representation of the embedded clock signal within the optical signal. For example, in one embodiment of the invention, the optical receiver 123 outputs a series of voltage pulses (in response to an incident optical signal) with a pulse magnitude of about 1.2V to 1.3V and a period (e.g., pulse frequency) equal to the period of the optical pulses of the transmitted optical signal.

The voltage regulator circuitry 127 is configured to generate a regulated supply voltage from the electrical signal, wherein the regulated supply voltage is utilized as a bias voltage for components of the tag device 120. In particular, the voltage regulator circuitry 127 is configured to generate and output a regulated DC voltage based on the AC voltage or current output from the optical receiver 123. The regulated DC voltage (which is generated by the voltage regulator circuitry 127) input to the state machine controller 121 and the non-volatile memory 128 to server as an internal VDD supply voltage.

In one embodiment of the invention, the voltage regulator circuitry 127 generates a regulated DC voltage of VDD=1V from the AC signal (voltage pulses with magnitude of about 1.2V to 1.3V) output from the optical receiver 123. In one embodiment of the invention, the voltage regulator circuitry 127 can be implemented using any voltage regulation framework comprising, e.g., a low-pass filter and analog regulator circuitry, which is suitable for the given application.

The clock extraction circuitry 125 is configured to extract the embedded clock signal from the electrical signal output from the optical receiver 123, and output the extracted clock signal as a clock signal for controlling clocking functions of the tag device 120. For example, in one embodiment of the invention, the clock extracting circuitry recovers the clock signal (with 50% duty cycle) embedded in the optical signal stream, wherein the extracted clock signal is used to clock the state machine controller 121 and the non-volatile memory 128. In particular, in the embodiment of FIG. 1, the clock extraction circuitry 125 generates and outputs a clock signal CLK1 based on the AC voltage (or current) signal output from the optical receiver 123. In one embodiment of the invention, the clock extraction circuitry 125 can be implemented using any clock extraction framework comprising, e.g., a passive clock recovery circuit with filtering and sampling circuitry for example, which is suitable for the given application.

The state machine controller 121 controls the internal and external flow of data of the tag device 120 based on the clock signal CLK1 output from the clock extraction circuitry 125. In one embodiment, the state machine controller 121 comprises circuitry to generate a clock signal CLK2 based on the clock signal CLK1, which is input to the non-volatile memory 128 and used to control memory access functions. The clock signal CLK2 may be the same or different from the clock signal CLK1, depending on the application. In another embodiment, the clock extraction circuitry 125 generates and directly outputs the clock signal CLK1 to other components of the tag device 120, which may be implemented in other embodiments. The state machine controller 121 comprises either fixed or programmable logic to control functions of the RFID tag device 120.

In one embodiment of the invention, the non-volatile memory 128 comprise a one-time field programmable fuse memory, which can be programmed by the state machine controller 121 with a specific TAG code that can be accessed by the interrogator device 110. In another embodiment of the invention, the non-volatile memory 128 may implement a multiple read/write memory device framework.

Figure 3:
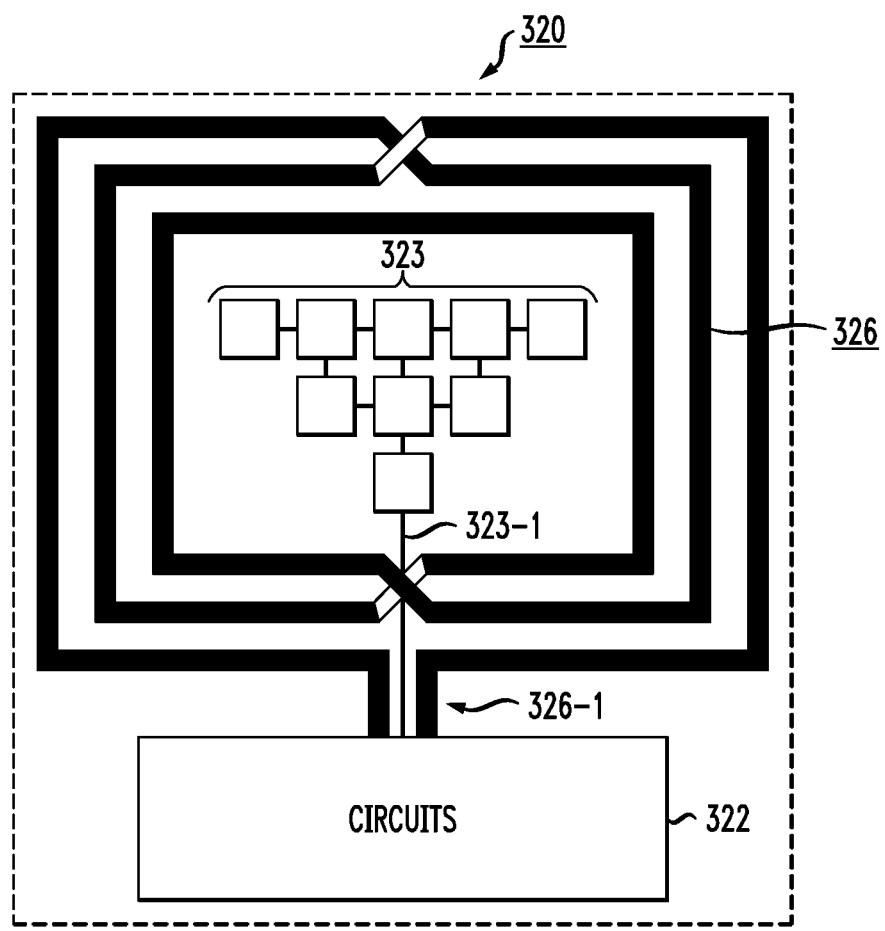
FIG. 3 schematically illustrates a layout of constituent components of a tag device according to an embodiment of the invention.

In one embodiment of the invention, the planar antenna 126 comprises a loop antenna. An illustrative embodiment of a planar loop antenna 326 is shown in FIG. 3. The planar loop antenna 326 is a RF antenna comprising a loop that includes one or more windings (e.g., 3 windings in the embodiment of FIG. 3) of patterned metallic material. The ends of the conductive loop are connected to a balanced transmission line 326-1. In one embodiment of the invention, the outer perimeter of the planar loop antenna 326 is much smaller than the operating wavelength of the RF system of the interrogator device 110. For example, the perimeter of the loop antenna 326 can be less than one tenth of the operating wavelength, such that there will be a relatively constant current distribution along the loop conductor.

In general, the RF receiver system 112 and the data transmitter system 122 operate in conjunction to transmit tag data from the tag device 120 to the interrogator device 110. The state machine controller 121 performs a memory access operation to read out tag data that is stored in the non-volatile memory 128. The state machine controller 121 generates and outputs a serial data bit stream (TX DATA) comprising the tag data read out from the memory 128. The receiver 114 transmits an unmodulated RF carrier signal from the interrogator device 110 via the RF antenna 116, which causes an unmodulated RF power to be present on the planar antenna 126 of the tag device 120.

To transmit the tag data, the impedance of the loop antenna 126 is modulated by the switching circuitry 124 in response to the serial data bit stream (TX DATA), which, in turn, modulates the RF power captured on the loop antenna 126 to encode the serial data bit stream on the RF carrier signal. The modulated RF power is reflected back (via backscattering) to the interrogator device 110, wherein the receiver circuitry 114 decodes the backscattered signal to recover the transmitted serial data bit stream. The controller 111 controls functions of the receiver circuitry 114 and processes the TX DATA that is received from the tag device 120 via the operations of the RF receiver 112 and the data transmitter systems 122.

In one embodiment of the invention, the RF antenna 116 (of the RF receiver system 112) and the planar antenna 126 (of the RF transmitter system 122) establish a loosely connected "space transformer" resulting in power transfer across short bidirectional reading distances (e.g., $d<\lambda/2\pi$). The coupling between the antennas 116 and 126 is predominantly magnetic when the physical dimensions of the planar antenna 126 is small compared to the operating wavelength of the system (e.g., wavelength of the unmodulated RF carrier signal transmitted from the interrogator device 110).

In one embodiment of the invention, the impedance of the on-chip planar antenna 126 (e.g., loop antenna) is controlled by the switching circuitry 124, which is operated by the serial data bit stream (TX DATA). Given the magnetic coupling between the planar antenna 126 and the RF antenna 116, any impedance change on the planar antenna 126 is reflected at the receiving RF antenna 116. The changes in impedance depend on the coupling factor and the number of windings in the antennas 126 and 116.

Moreover, in one embodiment of the invention, the receiver circuitry 114 implements an amplitude modulation scheme to detect changes in amplitude of the backscattered modulated RF carrier signal flowing in the RF antenna 116 of the RF receiver system 112, which changes in amplitude correspond to changes in the impedance of the planar antenna 126 as modulated by the serial data bit stream (TX DATA) that is transmitted to the interrogator device 110. For example, in one embodiment of the invention, the receiver circuitry 114 comprises an amplitude detector which is configured to provide ASK (Amplitude-shift keying) amplitude modulation to detect data bits of the transmitted serial data bit stream TX DATA imposed on the RF carrier signal.

In particular, the RF receiver system 112 receives and decodes amplitude modulated back-scattered RF power reflected from the antenna 126 of the data transmitter system 122. The serial data bit steam (TX DATA) to be transmitted is applied to the switching circuitry 124. Depending on the logic level of a given data bit in the serial data bit stream, the switching circuitry 124 is configured to control (open or close) one or more switching devices, and change impedance of the antenna 126, depending on the logic level of a given bit in the serial data stream. The activation and deactivation of the switching circuitry 124 causes changes in the impedance of the planar antenna 126 by, e.g., connecting or disconnecting the planar antenna 126 from ground, or by connecting the planar antenna 126 to different loads, etc.. The changes in impedance of the antenna 126 in turn cause changes in the amplitude of the RF carrier signal applied to the RF antenna 116 of the receiver system 112. The change in amplitude is detected by the receiver 114 using any suitable amplitude detection techniques, such as ASK as mentioned above. In other embodiments of the invention, to increase the sensitivity of the receiver 114, circuitry such as LNA (low noise amplifier) and IQ mixers can be implemented in the receiver 114.

FIG. 3 schematically illustrates a layout for a tag device according to an embodiment of the invention. In particular, FIG. 3 schematically illustrates a tag device 320 having various components (as discussed above with reference to FIGS. 1 and 2A/2B) arranged in a compact, and space efficient, device layout. For example, the tag device 320 comprises a circuit block 322 connected to an optical receiver 323 and a loop antenna 326 via planar transmission lines 323-1 and 326-1, respectively. The circuit block 322 comprises various circuitry of the tag device 320, e.g., the various circuits 121, 124, 125, 127, and 128 discussed above with reference to FIG. 1. In one embodiment, the optical receiver 323 comprises a photodiode stack, such as shown in FIGS. 2A/2B.

In the embodiment of FIG. 3, the optical receiver 323 is disposed within the inner region of the loop antenna 326 to save space. Since the loop antenna 326 and the optical receiver 323 are configured to operate at different frequencies and with different types of signals (RF and optical signals), there is no concern of interference or mutual coupling between the components of the optical and RF transmitter/receiver systems, in a compact, highly integrated layout, such as shown in FIG. 3. Moreover, while the circuit block 322 is shown disposed outside the loop antenna 326, in another embodiment of the invention, the circuit block 322, or portions thereof, can be disposed within the inner region of the loop antenna 326.

With an exemplary layout design and component architecture as shown in FIG. 3, the tag device 320 can be readily fabricated using CMOS technologies on a flexible substrate with an extremely small footprint. For example, a tag device according to embodiments of the invention can be constructed having each dimension (width, length, thickness) of 75 microns or less. As such, tag devices according to embodiments of the invention can be readily incorporated into various types of components such as contact lenses, paper, curved objects, etc., and used in various commercial and industrial applications.

FIG. 4 is a flow diagram of a method for reading data from a tag device in a radio frequency identification system, according to an embodiment of the invention. In particular, FIG. 4 is a flow diagram of a method for operating a radio frequency identification system such as shown in FIG. 1, wherein FIG. 4 illustrates modes of operation of the RFID interrogator device 110 and the RFID tag device 120 of FIG. 1, according to an embodiment of the invention. In general, the method steps 400-406 in FIG. 4 comprise functions that are implemented by the RFID interrogator device 110, while the method steps 410-418 comprise functions that are implemented by the RFID tag device 120.

Referring to FIG. 4, a signaling operation between the RFID interrogator device 110 and the RF tag device 120 is initiated by the RFID interrogator device 110 transmitting a pulsed optical signal with an embedded clock signal to the RFID tag device 120 (block 400). For example, in one embodiment of the invention, as discussed above, the optical transmission system 113 generates and outputs a pulsed laser signal that comprises an embedded clock signal having a 50% duty cycle. Moreover, on the RFID interrogator device 110, the receiver circuitry 114 generates and applies and unmodulated RF carrier signal to the RF antenna 116 of the RF receiver system 112 (block 402).

On the RFID tag device 120, the pulsed optical signal is received and converted to an electrical signal (block 410).

For example, in one embodiment of the invention as discussed above, the pulsed optical signal transmitted from the RFID interrogator device 110 is captured by the optical receiver 123 which comprises one or more photodiodes 123 operating in photovoltaic mode. The optical receiver 123 converts the photonic radiation of the pulsed optical signal to a pulsed electrical signal (e.g., current or voltage) at the output of the optical receiver 123.

Next, the embedded clock signal is extracted from the pulsed electrical signal and the extracted clock signal is output to one or more clocked components of the RFID tag device 110 such as the state machine controller 121 (block 412). In addition, a regulated supply voltage (e.g., bias voltage VDD) is generated from the pulsed electrical signal and applied to one or more components of the RFID tag device 110 such as the state machine controller 121 and the non-volatile memory 128 (block 414).

Once the regulated voltage and clocking signal are generated, a memory access operation is performed under control of the state machine controller 121 to read out data that is stored in the non-volatile memory 128 (block 416). In one embodiment of the invention, the state machine controller 121 applies a clock signal CLK2 (which is, or is otherwise derived from, the extracted clock signal CLK1) to the non-volatile memory 128, to read out stored data as a serial data bit stream (block 418). In one embodiment of the invention, the read out serial data bit stream comprises n-bit string of data that represents, e.g., a unique tag serial number, or an EPC (electronic product code) or other types of product-related information that can be stored as tag data.

The read out serial data bit stream is applied to the switching circuitry 124 of the data transmission system 122 of the RFID tag device 120 to modulate an impedance of the planar antenna 126 (block 418). By switching between lower and higher relative impedances, for example, the data transmitting system 122 of the RFID tag device 120 modulates the amplitude of a backscattered RF carrier signal that is reflected back to the RF antenna 116.

The receiver 114 detects changes in the amplitude of the backscattered RF carrier signal as modulated by the impedance changes of the planar antenna 126 on the RFID tag device 120 (block 404). As noted above, the antennas 116 and 126 are magnetically coupled, and any impedance change in the antenna 126 of the RFID tag device 120 is reflected to the RF antenna 116 of the RFID interrogator device 110. As a result, the unmodulated RF carrier signal that is applied to the RF antenna 116 is modulated in amplitude (e.g., ASK modulation) by data bits of the serial data bit stream (TX DATA) that is transmitted from the RFID tag device 120.

The receiver circuitry 112 decodes the detected changes in the amplified of the backscattered RF carrier signal to recover the serial data bit stream (TX DATA) that is transmitted from the RFID tag device 120 (block 406). The recovered serial data bit stream is sent to the controller 111 of the RFID interrogator device (block 408), wherein the data can be displayed for viewing by a user or read out to another device or system using known techniques.

Although embodiments have been described herein with reference to the accompanying drawings for purposes of illustration, it is to be understood that the present invention is not limited to those precise embodiments, and that various other changes and modifications may be affected herein by one skilled in the art without departing from the scope of the invention.

We claim:

1. A method for reading data from a tag device, comprising:
    receiving a pulsed optical signal from an interrogator device, wherein the received pulsed optical signal comprises an embedded clock signal;
    converting the pulsed optical signal into an electrical signal which represents the embedded clock signal within the pulsed optical signal;
    extracting the embedded clock signal from the electrical signal;
    utilizing the extracted clock signal as a clock signal for controlling clocking functions of the tag device;
    generating a regulated supply voltage from the electrical signal, wherein the regulated supply voltage is utilized as a bias voltage for components of the tag device;
    performing a memory access operation to read out tag data that is stored in a memory of the tag device using the extracted clock signal;
    generating a serial data bit stream comprising the read out tag data;
    transmitting the serial data hit stream to the interrogator device, wherein transmitting comprises:
        utilizing a loop antenna on the tag device to magnetically couple RF power from an unmodulated RF carrier signal applied to an RF antenna of the interrogator device; and
        changing an impedance of the loop antenna on the tag device in response to changes in logic levels of data bits of the serial data bit stream, wherein changing the impedance of the loop antenna modulates the RF power on the loop antenna and causes modulated RF power encoded with the serial data bit stream to be reflected back to the RF antenna of the interrogator device;
    wherein changing the impedance of the loop antenna on the tag device in response to changes in logic levels of data bits of the serial data hit stream, comprises:
        applying the serial data bit stream to switching circuitry; and
        operating the switching circuitry to selectively connect and disconnect the loop antenna on the tag device to a ground terminal, based on logic levels of the data bits in the serial data bit stream applied to the switching circuitry;
    wherein the method steps are performed by the tag device.

2. The method of claim 1, wherein the pulsed optical signal received from the interrogator device comprises a pulsed optical laser signal.

3. The method of claim 1, wherein converting the pulsed optical signal into an electrical signal comprises:
    capturing photonic energy of the pulsed optical signal using one or more photodiodes operating in a photovoltaic mode; and
    converting the captured photonic energy into a voltage or current signal.

4. The method of claim 1, wherein the loop antenna comprises a multi-loop antenna having a dimension that is smaller than a wavelength of the unmodulated RF carrier signal applied to the RF antenna of the interrogator device.

5. The method of claim 1, wherein utilizing the extracted clock signal as a clock signal for controlling the clocking functions of the tag device comprises inputting the extracted clock signal to state machine control circuitry on the tag device to enable the state machine control circuitry to operate and control functions of the tag device.

* * * * *